US 6,732,709 B1

(12) United States Patent
Havran et al.

(10) Patent No.: US 6,732,709 B1
(45) Date of Patent: May 11, 2004

(54) DYNAMIC ENGINE TIMING CONTROL

(75) Inventors: Richard L. Havran, Lafayette, IN (US); Rick I. Zadoks, Lafayette, IN (US); James W. Harris, Galveston, IN (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 10/313,180

(22) Filed: Dec. 6, 2002

(51) Int. Cl.[7] ................................................. F02P 5/00
(52) U.S. Cl. ........................... 123/406.24; 123/406.41; 123/406.35; 123/406.36
(58) Field of Search ....................... 123/406.24, 406.41, 123/406.35, 406.36, 406.18, 406.12, 406.61

(56) References Cited

U.S. PATENT DOCUMENTS

| | | |
|---|---|---|
| 4,086,894 A | 5/1978 | Capurka et al. |
| 4,249,416 A | 2/1981 | Kotwicki |
| 4,378,004 A | 3/1983 | Petrie |
| 4,788,956 A | 12/1988 | Suzuki et al. |
| 4,998,103 A | 3/1991 | Rosswurm et al. |
| 5,209,202 A | 5/1993 | Maurer et al. |
| 5,219,398 A | 6/1993 | Nonaka et al. |
| 5,239,962 A | 8/1993 | Fukui et al. |
| 5,505,177 A | 4/1996 | Herdin et al. |
| 5,531,108 A | 7/1996 | Feldkamp et al. |
| 5,611,311 A | 3/1997 | Tomisawa |
| 5,647,322 A | 7/1997 | Fukui et al. |
| 5,699,253 A | 12/1997 | Puskorius et al. |
| 5,717,133 A | 2/1998 | Wu et al. |
| 5,860,406 A | 1/1999 | Schmidt et al. |
| 5,878,717 A | 3/1999 | Zur Loye |
| 6,006,155 A * | 12/1999 | Wu et al. .................... 701/111 |
| 6,006,726 A | 12/1999 | Mai et al. |
| 6,170,468 B1 | 1/2001 | Wada |

* cited by examiner

*Primary Examiner*—Bibhu Mohanty
(74) *Attorney, Agent, or Firm*—Steve D Lundquist

(57) ABSTRACT

A method and apparatus for controlling timing of an internal combustion engine having a piston located in a cylinder. The method and apparatus includes determining a first angular position of a crankshaft at a first location along a longitudinal axis of the crankshaft, determining a second angular position of the crankshaft at a second location along the longitudinal axis, determining a level of deformation of the crankshaft as a function of a difference between the first and second angular positions, determining an actual position of the piston as a function of the crankshaft deformation, comparing the actual piston position to a desired piston position, and controlling timing of an event to initiate combustion in the cylinder as a function of a difference between the actual and desired piston positions.

25 Claims, 3 Drawing Sheets

DYNAMIC ENGINE TIMING CONTROL

TECHNICAL FIELD

This invention relates generally to a method and apparatus for controlling combustion timing of an internal combustion engine and, more particularly, to a method and apparatus for controlling cylinder-to-cylinder timing variations caused by crankshaft deformation.

BACKGROUND

Control of combustion timing of cylinders in an internal combustion engine significantly affects performance characteristics of the engine. The timing events which initiate combustion control the fuel efficiency, gaseous emissions formation, and internal loads generated in each cylinder.

Many methods and systems exist which determine the engine crankshaft position, thus providing the information needed to control delivery timing to desired values. For example, in U.S. Pat. No. 5,860,406, Schmidt et al. disclose an apparatus and method which monitors the rotation of a crankshaft, monitors the rotation of a camshaft, and responsively determines engine timing. The timing information is then used to initiate fuel injection into cylinders at the desired time. Other examples of methods and systems which determine engine timing exist, many of which determine an angular position of the crankshaft as an integral part of the method.

Multiple cylinder engines, in particular larger or high performance engines, generate tremendous amounts of torque under certain operating conditions. This torque is centered about the crankshaft, which operates as a power transfer device between the pistons and the drive train. Although crankshafts are designed to withstand the stresses associated with this torque, some degree of deformation of the crankshaft takes place. The deformation of the crankshaft reflects back to the positions of the pistons with respect to each other. This change in individual piston position causes timing variations relevant to individual cylinders. More specifically, cylinder-to-cylinder timing is adversely affected.

The timing methods in use today can monitor and control overall engine timing, but cannot account for cylinder-to-cylinder delivery timing variations caused by crankshaft deformations.

The present invention is directed to overcoming one or more of the problems as set forth above.

SUMMARY OF THE INVENTION

In one aspect of the present invention a method for controlling timing of an internal combustion engine having a piston located in a cylinder is disclosed. The method includes the steps of determining a first angular position of a crankshaft at a first location along a longitudinal axis of the crankshaft, determining a second angular position of the crankshaft at a second location along the longitudinal axis, determining a level of deformation of the crankshaft as a function of a difference between the first and second angular positions, determining an actual position of the piston as a function of the crankshaft deformation, comparing the actual piston position to a desired piston position, and controlling timing of an event to initiate combustion in the cylinder as a function of a difference between the actual and desired piston positions.

In another aspect of the present invention an apparatus for controlling timing of an internal combustion engine having a piston located in a cylinder is disclosed. The apparatus includes a first crankshaft angular position determiner located to determine an angular position at a first location along a longitudinal axis of a crankshaft, a second crankshaft angular position determiner located to determine an angular position at a second location along the longitudinal axis, and a controller for determining a level of deformation of the crankshaft as a function of a difference between the first and second angular positions, determining an actual position of the piston as a function of the crankshaft deformation, comparing the actual piston position to a desired piston position, and controlling timing of an event to initiate combustion in the cylinder as a function of a difference between the actual and desired piston positions.

DETAILED DESCRIPTION

Figure 1:
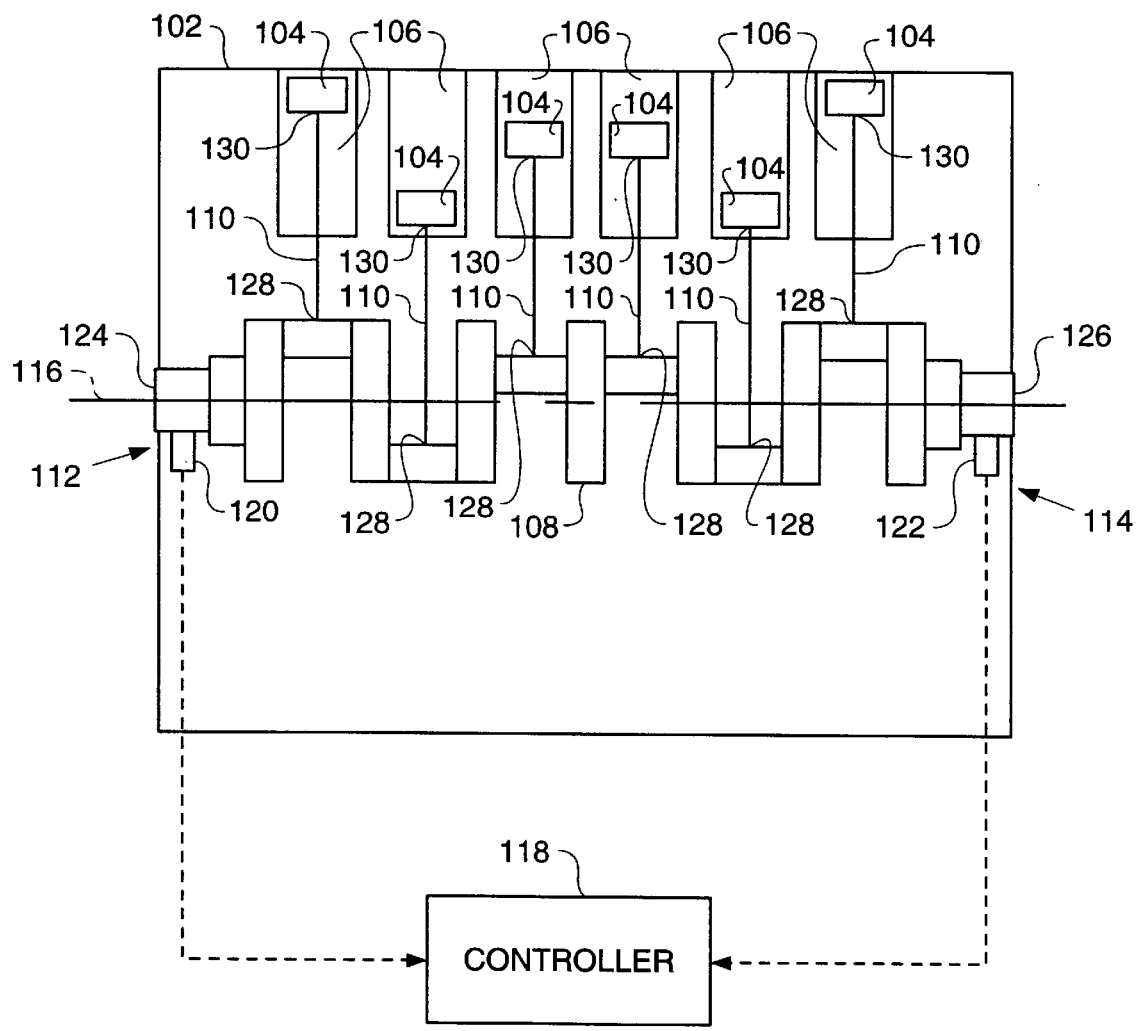
FIG. 1 is a diagrammatic illustration of a preferred embodiment of the present invention.

Referring to the drawings, a method and apparatus 100 for controlling timing of an internal combustion engine 102 having at least one piston 104 located in a corresponding cylinder 106 is shown. Each piston 104 is drivably connected to a crankshaft 108 by way of a corresponding connecting rod 110. More specifically, each connecting rod 110 has a first end 128 connected to the crankshaft 108 and a second end 130 connected to a corresponding piston 104. Each connecting rod 110 may be of one-piece design or may be of some other design, e.g., a master-slave connecting rod arrangement and the like. In operation, the pistons 104 are powered to move in each corresponding cylinder 106 in a linear, i.e., up and down, motion. The linear movement of the pistons 104 translates to a rotating motion of the crankshaft 108 by way of the connecting rods 110. The crankshaft 108 in turn provides power for a drive train (not shown), generator (not shown), and the like.

FIG. 1 depicts an engine 102 having six pistons 104 located in each of six cylinders 106 and connected to the crankshaft 108 by each of six connecting rods 110. It is noted, however, that an engine 102 having any number of pistons 104 and cylinders 106 may be used. For example, one, four, six, eight, ten, twelve, twenty, and such pistons may be used in an engine 102.

Each of the six pistons 104 in FIG. 1 is connected to the crankshaft 108 at a different location along the length of the crankshaft 108, i.e., along a longitudinal axis 116 defining the length of the crankshaft 108. It is well known in the art that each piston 104 engages in a power stroke, i.e., a combustion stroke, which transfers power to the crankshaft 108 to drive the crankshaft 108 in a rotating motion. The power transferred to the crankshaft 108, in conjunction with resistance to motion by a load (not shown) coupled to the crankshaft 108, creates a torque, which causes angular deformation of the crankshaft 108. This angular deformation may be commonly described as "twisting" of the crankshaft 108. For example, a crankshaft 108 may twist one or more degrees from a first end 124 to a second end 126.

The deformation of the crankshaft 108 translates back to a linear displacement of each piston 104. The amount of linear displacement varies as a function of the amount of crankshaft deformation at various locations along the longitudinal axis 116. The linear displacement of each piston 104 results in an uncertainty in the location of each piston 104 in each corresponding cylinder 106 during the combustion events. The uncertainty in location of each piston 104 leads to non-optimal timing of combustion which results in increased overall emissions of pollutants such as NOx, reduced fuel efficiency, and increased cylinder loads.

In the preferred embodiment of FIG. 1, a first crankshaft angular position determiner 112 is located to determine an angular position at a first location along the longitudinal axis 116. For example, in FIG. 1, the first crankshaft angular position determiner 112 is shown located near the first end 124 of the crankshaft 108.

A second crankshaft angular position determiner 114 is located to determine an angular position at a second location along the horizontal axis 116. For example, in FIG. 1, the second crankshaft angular position determiner 114 is shown located near the second end 126 of the crankshaft 108.

It is noted that the first and second crankshaft angular position determiners 112,114 may be located at other positions along the longitudinal axis 116. For example, one may be located at one end of the crankshaft 108 and the other may be located at some point along the crankshaft 108 away from either end. Alternatively, both may be located at points away from either end. Furthermore, additional crankshaft angular position determiners (not shown) may be used and located at additional positions along the longitudinal axis 116.

Preferably, at least one of the first and second crankshaft angular position determiners 112,114 includes a crankshaft angular position sensor, for example, a first angular position sensor 120 and a second angular position sensor 122. Crankshaft position sensors are well known in the art and may include such sensors as proximity sensors, optical sensors, magnetic switch sensors, and the like.

A controller 118 is configured to receive signals from the first and second crankshaft angular position determiners 112,114 and to perform various functions in connection with the present invention, as is described in more detail below. The controller 118 may be a microprocessor-based unit, including, for example, a processor, memory, input-output ports, and the like. The controller 118 may be a unit dedicated to performing tasks for the present invention, or may be a unit shared for other functions not relevant to the present invention.

Figure 3:
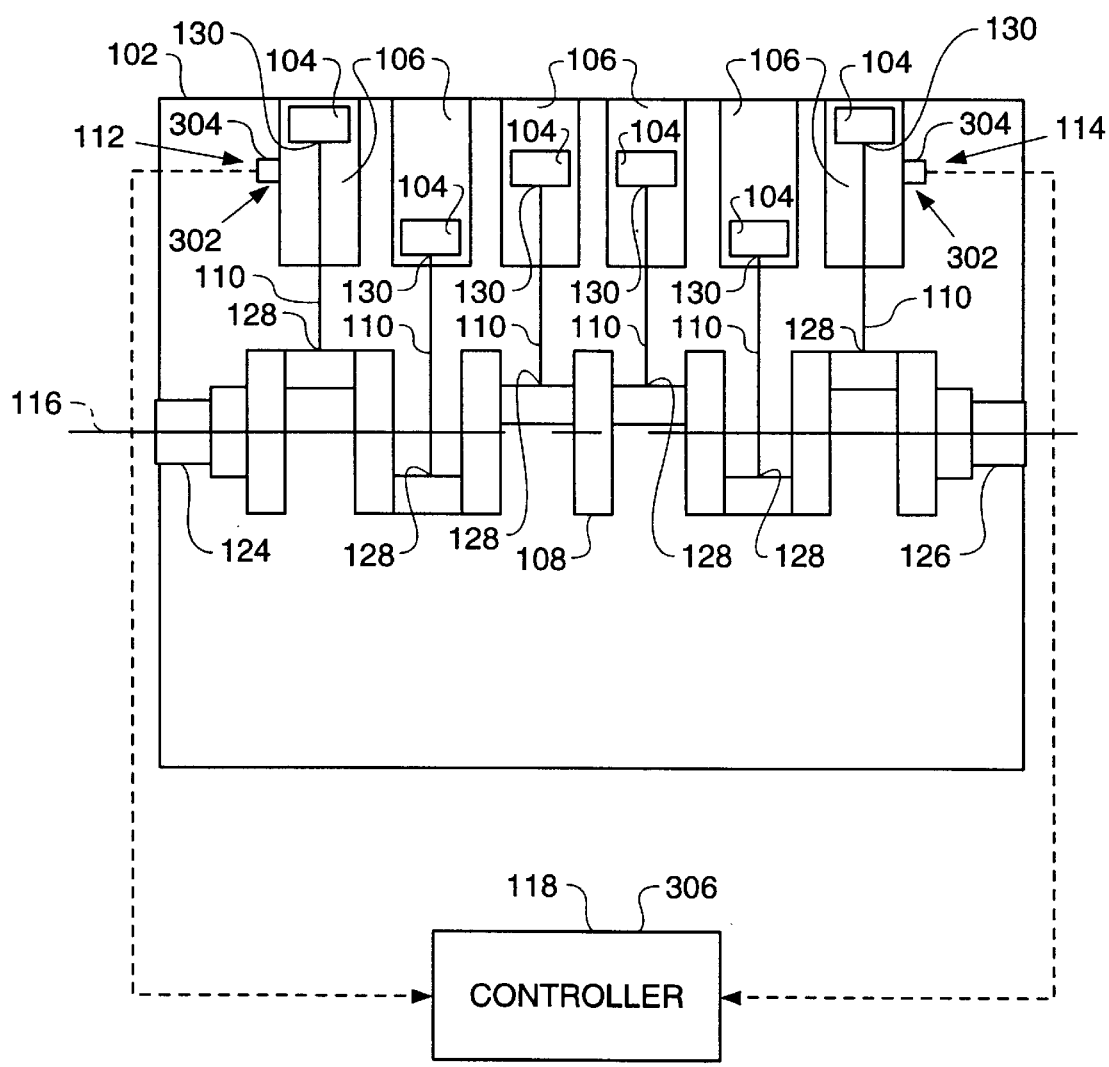
FIG. 3 is a diagrammatic illustration of an alternate embodiment of the present invention.

FIG. 3 illustrates an alternate embodiment of the present invention. The first and second crankshaft angular position determiners are no longer located along the longitudinal axis 116 of the crankshaft 108, but are instead positioned near two of the cylinders 106 and their corresponding pistons 104. In the preferred embodiment, piston position detectors 302 are used to determine the position of the pistons 104 in the cylinders 106, e.g., with respect to top dead center. For example, cylinder pressure sensors 304 may be used to sense the pressure in each pertinent cylinder 106. It is known that piston position may be accurately determined by sensing the pressure in a cylinder 106 as the piston 104 moves up and down through the various strokes. FIG. 3 depicts two cylinder pressure sensors 304, for example, one sensor 304 at each cylinder 106 nearest the two ends 124,126 of the crankshaft 108. However, the cylinder pressure sensors 304 may be located at any two cylinders 106 in the engine 102. Furthermore, there may be any number of cylinder pressure sensors 304 used, for example, for one, three, or all cylinders 106.

A means 306 for determining angular position of the crankshaft 108 at each corresponding crankshaft location converts the sensed position of each piston 104 to a determined angular position of a corresponding location on the crankshaft 108. For example, in FIG. 3, the sensed piston positions of the two pistons 104 having cylinder pressure sensors 304 located thereby may be used to determine the angular position of the crankshaft 108 at the locations where the connecting rods 110 for each respective piston 104 connect to the crankshaft 108.

Alternatively, a difference in the sensed positions of the two pistons 104 may be compared to an expected difference in their positions under conditions of no crankshaft deformation, thus allowing a more direct determination of crankshaft deformation under operating conditions. For example, it may be expected that the two outermost pistons, as shown in FIG. 3, are in the same position with respect to top dead center, i.e., they are in sync with each other. Any determined variation in this expected alignment of positions would be interpreted as deformation of the crankshaft 108.

A variation of the embodiment of FIG. 1 may be used in which cylinder pressure sensors, e.g., ion probes and the like, are used in coordination with crankshaft angular position determiners 112,114 to supplement the determined angular distortion measurements of the crankshaft 108. As an alternative, the cylinder pressure sensors, for example the cylinder pressure sensors 304 of FIG. 3, may be used to correct the determinations made from the crankshaft angular position determiners 112,114, or to adapt, e.g., calibrate, by use of the measured results of the crankshaft angular position determiners 112,114.

The means 306 for determining angular position of the crankshaft 108 as a function of piston positions may be incorporated as a function of the controller 118. However, the means 306 may employ a separate processor (not shown) as well.

Industrial Applicability

Figure 2:
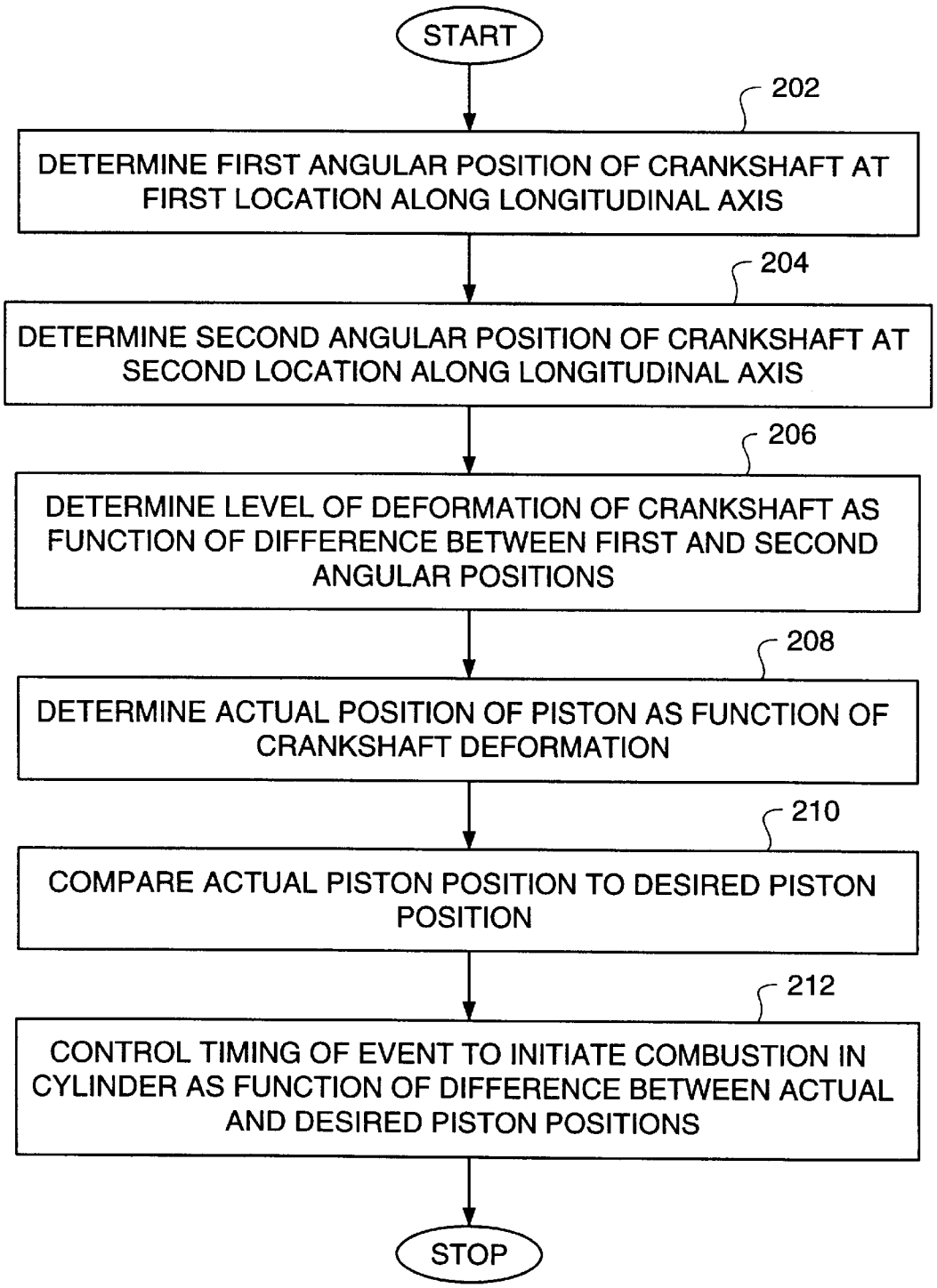
FIG. 2 is a flow diagram illustrating a preferred method of the present invention.

Referring to FIG. 2, a flow diagram illustrating a preferred method of the present invention is shown.

In a first control block 202, a first angular position of the crankshaft 108 at a first location along the longitudinal axis 116 of the crankshaft 108 is determined. For example, the angular position at the first end 124 of the crankshaft 108 may be determined. Alternatively, the angular position at some other location along the crankshaft 108 may be determined.

In a second control block 204, a second angular position of the crankshaft 108 at a second location along the longitudinal axis 116 is determined. For example, the angular position at the second end 126 of the crankshaft 108 may be determined. Alternatively, the angular position at some other location along the crankshaft 108 may be determined.

The first and second angular positions may be determined by any of the methods described above or by other methods, such as, for example, direct sensing of crankshaft position, sensing of other crankshaft parameters such as velocity or acceleration and subsequent determination of crankshaft position, determination of piston position and subsequent determination of crankshaft position, and the like.

In a third control block 206, a level of deformation of the crankshaft 108 is determined as a function of a difference between the first and second angular positions. For example, it may be determined that the crankshaft 108 is twisted by some angular amount, such as one degree, from the first determined location to the second determined location.

In a fourth control block 208, an actual position of each piston 104 is determined as a function of the crankshaft deformation. Preferably, the level of deformation at various locations along the crankshaft 108 is determined, for example, by an algorithm which interpolates the deformation based on the determined deformation at the two original locations. The locations of interest along the crankshaft 108 are typically the locations in which the connecting rods 110 connect to the crankshaft 108. These locations would correspond to each connecting piston 104, thus providing a direct transfer of determined crankshaft deformation to determined piston position displacement.

In a fifth control block 210, each actual piston position is compared to corresponding desired piston positions. The difference between an actual and a desired piston position is the amount in which crankshaft deformation has changed piston position from ideal. In the preferred embodiment, a desired piston position is equal to an ideal piston position, i.e., the position the piston would be in if no crankshaft deformation occurred. However, the desired piston position may be a position other than ideal as well, without affecting the scope of the present invention.

In a sixth control block 212, the timing of an event is controlled as a function of the difference between the actual and desired piston positions. In the preferred embodiment, the event initiates combustion in a corresponding cylinder 106, such as a start of fuel injection in a compression-ignition engine 102, a start of ignition in an ignition-combustion engine 102, and the like. Control of the timing of an event to initiate combustion compensates for the change in desired position of the piston 104, thus providing timing of combustion at the optimal piston position for engine performance and reduced emissions.

The level of deformation of the crankshaft 108, as determined in the third control block 206, may be used for purposes other than determining actual piston position. For example, the level of deformation of the crankshaft 108 may be used as an indicator of an amount of load being placed on the engine 102. In addition, a notification to an operator or fleet manager may be made based on the determined level of deformation to indicate that an allowable tolerance has been exceeded. The notification may be in the form of an alert, for example. A history of the level of deformation may be logged to provide an indication of the type of use the engine 102 is being subjected to.

Other aspects can be obtained from a study of the drawings, the disclosure, and the appended claims.

What is claimed is:

1. A method for controlling timing of an internal combustion engine having a piston located in a cylinder, the piston being drivably connected to a crankshaft, including the steps of:
   determining a first angular position of the crankshaft at a first location along a longitudinal axis of the crankshaft;
   determining a second angular position of the crankshaft at a second location along the longitudinal axis;
   determining a level of deformation of the crankshaft as a function of a difference between the first and second angular positions;
   determining an actual position of the piston as a function of the crankshaft deformation;
   comparing the actual piston position to a desired piston position; and
   controlling timing of an event to initiate combustion in the cylinder as a function of a difference between the actual and desired piston positions.

2. A method, as set forth in claim 1, wherein determining a first and a second angular position includes the steps of sensing a first and second angular position of the crankshaft.

3. A method, as set forth in claim 1, wherein determining a level of deformation of the crankshaft includes the step of determining an angular deformation of the crankshaft.

4. A method, as set forth in claim 3, wherein determining an angular deformation of the crankshaft includes the step of determining an amount of angular deformation at a predetermined location along the longitudinal axis of the crankshaft.

5. A method, as set forth in claim 1, wherein determining an actual position of the piston includes the step of determining an actual piston position with respect to a top dead center position in the cylinder.

6. A method, as set forth in claim 1, wherein controlling timing of an event includes the step of controlling timing of at least one of a fuel injection event and an ignition event.

7. A method for controlling timing of an internal combustion engine having a plurality of pistons each located in a corresponding one of a plurality of cylinders, each piston being drivably connected to a crankshaft, including the steps of:
   determining a first angular position of the crankshaft at a first location along a longitudinal axis of the crankshaft;
   determining a second angular position of the crankshaft at a second location along the longitudinal axis;
   determining a level of deformation of the crankshaft as a function of a difference between the first and second angular positions;
   determining an actual position of each piston as a function of the crankshaft deformation;
   comparing each actual piston position to a corresponding desired piston position; and
   controlling timing of an event to initiate combustion in each cylinder as a function of a difference between the actual and desired piston positions.

8. A method, as set forth in claim 7, wherein determining a first and a second angular position includes the steps of sensing a first and second angular position of the crankshaft.

9. A method, as set forth in claim 7, wherein determining a level of deformation of the crankshaft includes the step of determining an angular deformation of the crankshaft.

10. A method, as set forth in claim 9, wherein determining an angular deformation of the crankshaft includes the step of determining an amount of angular deformation at predetermined locations along the longitudinal axis of the crankshaft.

11. A method, as set forth in claim 7, wherein determining an actual position of each piston includes the step of determining actual piston positions with respect to a top dead center position in each corresponding cylinder.

12. A method, as set forth in claim 7, wherein controlling timing of an event includes the step of controlling timing of at least one of a fuel injection event and an ignition event in each cylinder.

13. An apparatus for controlling timing of an internal combustion engine having a piston located in a cylinder, the piston being drivably connected to a crankshaft, comprising:
   a first crankshaft angular position determiner located to determine an angular position at a first location along a longitudinal axis of the crankshaft;
   a second crankshaft angular position determiner located to determine an angular position at a second location along the longitudinal axis; and
   a controller for determining a level of deformation of the crankshaft as a function of a difference between the first and second angular positions, determining an actual position of the piston as a function of the crankshaft deformation, comparing the actual piston position to a desired piston position, and controlling timing of an event to initiate combustion in the cylinder as a function of a difference between the actual and desired piston positions.

14. An apparatus, as set forth in claim 13, further including a plurality of pistons each located in a corresponding one of a plurality of cylinders, each piston being drivably connected to the crankshaft.

15. An apparatus, as set forth in claim 14, wherein the controller is further configured for determining an actual position of each piston as a function of the crankshaft deformation, comparing each actual piston position to a corresponding desired piston position, and controlling timing of an event to initiate combustion in each cylinder as a function of a difference between the actual and desired piston positions.

16. An apparatus, as set forth in claim 13, wherein the first crankshaft angular position determiner includes a crankshaft angular position sensor.

17. An apparatus, as set forth in claim 13, wherein the second crankshaft angular position determiner includes a crankshaft angular position sensor.

18. An apparatus, as set forth in claim 13, wherein the first and second crankshaft angular position determiners include respective first and second crankshaft angular position sensors.

19. An apparatus, as set forth in claim 18, wherein the first crankshaft angular position sensor is located at a first position along the longitudinal axis, and the second crankshaft angular position sensor is located at a second position along the longitudinal axis.

20. An apparatus, as set forth in claim 19, wherein the first crankshaft angular position sensor is located at a first end of the crankshaft, and the second crankshaft angular position sensor is located at a second end of the crankshaft.

21. An apparatus, as set forth in claim 14, wherein at least one of the first and second crankshaft angular position determiners includes:

a piston position detector for determining a position of one of the plurality of pistons; and means for determining the angular position at a corresponding at least one of the first and second crankshaft locations as a function of the piston position.

22. An apparatus, as set forth in claim 21, wherein the piston position detector includes a cylinder pressure sensor.

23. An apparatus for controlling cylinder-to-cylinder timing in an internal combustion engine, comprising:

a crankshaft located in the engine;

a plurality of connecting rods each having a first end connected to the crankshaft;

a plurality of pistons each connected to a second end of a corresponding one of the plurality of connecting rods such that each piston is configured to drivably engage the crankshaft;

a plurality of cylinders located in the engine, each piston being slidably positioned within a corresponding cylinder;

a first angular position sensor located at a first location along a longitudinal axis of the crankshaft;

a second angular position sensor located at a second location along the longitudinal axis; and a controller electrically connected to the first and second angular position sensors;

wherein the controller receives signals from the first and second angular position sensors indicative of angular positions of the respective first and second locations along the longitudinal axis, determines a level of deformation of the crankshaft, determines an actual position of each piston as a function of the crankshaft deformation, and controls timing of an event to initiate combustion in each cylinder as a function of a difference of each actual piston position from each corresponding desired piston position.

24. An apparatus, as set forth in claim 23, wherein an event to initiate combustion includes a start of injection of fuel.

25. An apparatus, as set forth in claim 23, wherein an event to initiate combustion includes an ignition of fuel.

* * * * *